United States Patent
Pendleton

(10) Patent No.: US 10,400,925 B2
(45) Date of Patent: Sep. 3, 2019

(54) MANUAL QUICK CONNECT HUB CLAMPING SYSTEM

(71) Applicant: Axon Pressure Products, Inc., Houston, TX (US)

(72) Inventor: Gary Pendleton, Gateshead (GB)

(73) Assignee: Axon Pressure Products, Inc., Houston, TX (US)

( * ) Notice: Subject to any disclaimer, the term of this patent is extended or adjusted under 35 U.S.C. 154(b) by 124 days.

(21) Appl. No.: 15/480,063

(22) Filed: Apr. 5, 2017

(65) Prior Publication Data

US 2017/0292642 A1    Oct. 12, 2017

Related U.S. Application Data

(60) Provisional application No. 62/320,144, filed on Apr. 8, 2016.

(51) Int. Cl.
| | |
|---|---|
| *F16L 23/08* | (2006.01) |
| *E21B 17/04* | (2006.01) |
| *E21B 33/03* | (2006.01) |
| *E21B 33/06* | (2006.01) |

(52) U.S. Cl.
CPC .............. *F16L 23/08* (2013.01); *E21B 17/04* (2013.01); *E21B 33/03* (2013.01); *E21B 33/06* (2013.01); *F16L 2201/10* (2013.01)

(58) Field of Classification Search
CPC .................................... F16L 23/04; F16L 23/08
USPC ........................................................ 285/411
See application file for complete search history.

(56) References Cited

U.S. PATENT DOCUMENTS

| | | | | |
|---|---|---|---|---|
| 180,781 | A * | 8/1876 | Morgan | F16L 23/20 |
| | | | | 285/334.2 |
| 2,353,572 | A * | 7/1944 | Kuster | F16L 23/08 |
| | | | | 114/22 |
| 2,868,565 | A * | 1/1959 | Suderow | E02B 17/0004 |
| | | | | 285/308 |
| 3,044,657 | A * | 7/1962 | Horton | F16L 25/065 |
| | | | | 220/4.17 |
| 4,063,758 | A * | 12/1977 | Westberg | F16L 23/04 |
| | | | | 138/89 |
| 4,146,261 | A * | 3/1979 | Edmaier | F01D 25/243 |
| | | | | 285/364 |

(Continued)

FOREIGN PATENT DOCUMENTS

GB         1504914 A  *  3/1978 ............. F16L 23/04

*Primary Examiner* — David Bochna
(74) *Attorney, Agent, or Firm* — Baker Botts L.L.P.

(57) ABSTRACT

Present embodiments of the disclosure are directed to an improved hub clamping system and method used to connect and seal a pair of API hubs. The hub clamping system generally includes a plurality of individually operated clamp units assembled within a single outer retaining ring. The clamp units disposed in the retaining ring may provide a multi-segment clamping arrangement to hold the API hubs together. The clamp units may each include a collet mechanism having a slanted surface shaped to engage one of the pair of hubs, a housing mounted to the outer retaining ring, and a screw device coupled to the collet mechanism via threads and disposed within the housing. The screw device may be rotatable relative to the housing to selectively move the collet mechanism between an activated position and a retracted position relative to the hubs.

17 Claims, 8 Drawing Sheets

(56) References Cited

U.S. PATENT DOCUMENTS

| | | | | |
|---|---|---|---|---|
| 4,327,942 A * | 5/1982 | Abbes | ............... | F16L 37/26 |
| | | | | 285/325 |
| 5,149,143 A * | 9/1992 | Howell | ............... | E21B 33/03 |
| | | | | 285/18 |
| 5,443,581 A * | 8/1995 | Malone | ............... | F16L 23/04 |
| | | | | 285/336 |
| 5,951,066 A * | 9/1999 | Lane | ............... | F16L 25/065 |
| | | | | 285/364 |
| 8,430,433 B2 * | 4/2013 | Maier | ............... | F04D 29/624 |
| | | | | 285/406 |
| 8,740,260 B1 * | 6/2014 | Liew | ............... | E21B 33/03 |
| | | | | 285/364 |

* cited by examiner

MANUAL QUICK CONNECT HUB CLAMPING SYSTEM

CROSS REFERENCE TO RELATED APPLICATIONS

The present application claims priority to U.S. Provisional Application No. 62/320,144 filed Apr. 8, 2016, which is incorporated herein by reference in its entirety for all purposes.

TECHNICAL FIELD

Embodiments of the present disclosure relate generally to hub clamping mechanisms, and more specifically, to a manual quick connect hub clamping system for use in conjunction with API 16A rated hubs.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

In various oil and gas applications, lengths of tubular, wellhead and BOP components, and various other types of equipment are often coupled together end to end to define an internal bore through which fluids and equipment can be communicated. API hubs with specific pressure ratings are used to form and seal connections that will be exposed to high pressure operating conditions. Typically, API hubs are mounted onto the ends of the equipment to be coupled together, and a hub clamp is positioned around the two hubs to retain the API hubs together during operation of the equipment.

To establish the clamping connection, the hub clamp impinges on angled surfaces of the opposing hubs and, when tightened, provides a compressive action on the hubs to generate a seal (e.g., when used with sealing rings). The hub clamp then has to maintain the clamping force generated on the API hubs to facilitate effective operation of the equipment under high pressure operational conditions. The joint can later be broken by simply releasing the hub clamp, thereby allowing the hubs to be separated.

Conventional hub clamps generally include two opposing clamp halves that are drawn together via a stud/nut combination at one end to tighten the clamp halves against the API hubs. As the stud/nut combination is tightened, the clamp halves push against the hubs to generate the compressive force needed to seal the connection. Unfortunately, these existing hub clamps are often bulky and cumbersome to fit around the hubs, leading to alignment issues when being positioned around the API hubs prior to tightening. Existing hub clamps also require high torque capacity equipment to operate the stud/nut connection. Further, these hub clamps are often constructed via bespoke manufacturing, such that a specific clamp is required and only compatible with a specific hub arrangement.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, embodiments of the disclosure are directed to an improved hub clamping system used to connect and/or seal a pair of API hubs. The hub clamping system generally includes a plurality of individually operated clamp units assembled within a single outer retaining ring. The clamp units disposed in the retaining ring may provide a multi-segment clamping arrangement to hold the API hubs together. In some embodiments, the hub clamping system may include an outer retaining ring having an inner bore that is larger in diameter than a maximum outer diameter of the pair of hubs. The clamp units may each include a collet mechanism having a slanted surface shaped to engage one of the pair of hubs, a housing mounted to the outer retaining ring, and a screw device coupled to the collet mechanism via threads and disposed within the housing. A portion of the screw device may extend outside of the housing for engagement by an operator or torque-transmitting tool. The screw device may be rotatable relative to the housing to selectively move the collet mechanism between an activated position and a retracted position relative to the hubs.

The disclosed hub clamping designs provide a flexible approach to the style of clamping employed to connect two hubs. In some embodiments, the hub clamping system allows either an upper set of collets or a lower set of collets to be retracted, thereby allowing the entire hub clamping assembly to stay with a certain piece of equipment such as the lower hub. Retracting both the upper and lower sets of collets allows the entire hub clamping assembly to be removed as one piece.

Figure 1A:
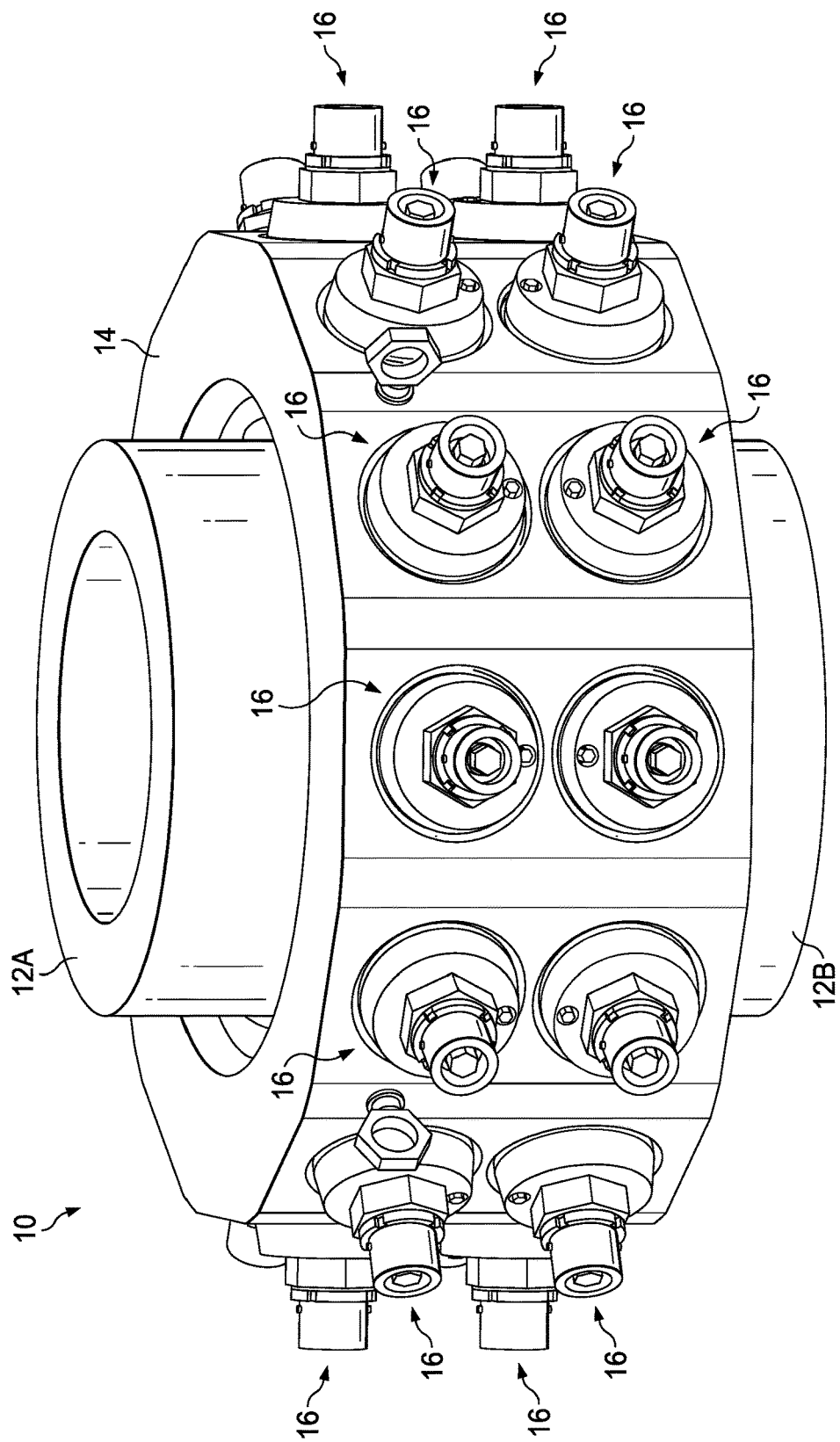
FIGS. 1A and 1B are perspective and side views of a hub clamp used to connect two API hubs, in accordance with an embodiment of the present disclosure.
Figure 1B:
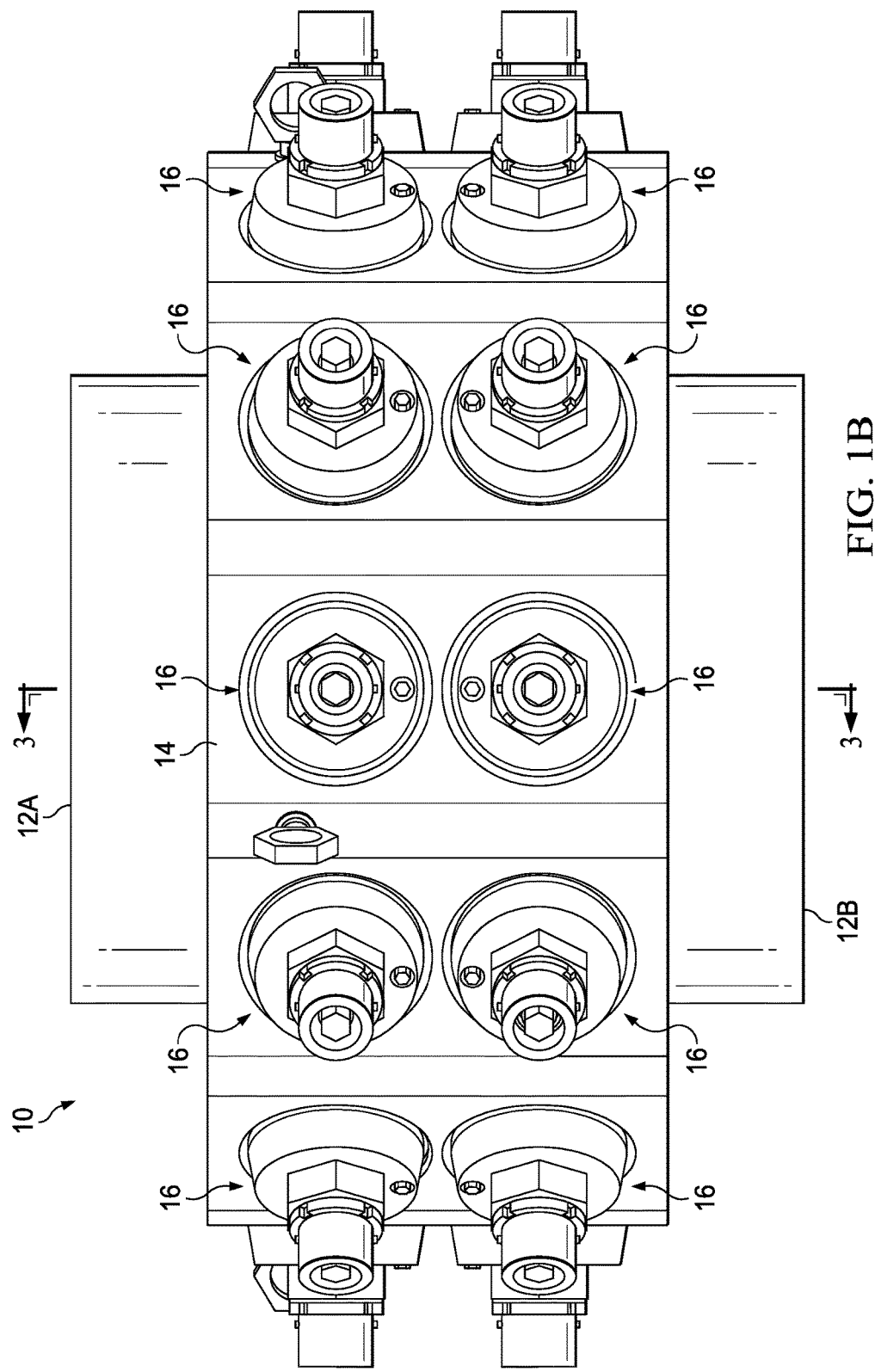

Turning now to the drawings, FIGS. 1A and 1B illustrate a hub clamping system 10 being used to hold two opposing API hubs 12 together, in accordance with an embodiment of the present disclosure. As illustrated, the hub clamping system 10 may include a large outer retaining ring 14 with several individually actuated clamp units 16 positioned therein. The clamp units 16 are arranged in pairs, and each pair has one clamp unit 16 designed to interface with a slanted surface of the upper hub 12A and another clamp unit 16 designed to interface with a slanted surface of the lower hub 12B. There may be any desirable number of clamp unit pairs disposed around the circumference of the outer retaining ring 14. As shown, the clamp units 16 may be equally spaced about the circumference of the outer retaining ring 14, such that they apply a consistent clamping force around the entire circumference of the hub connection.

Figure 2:
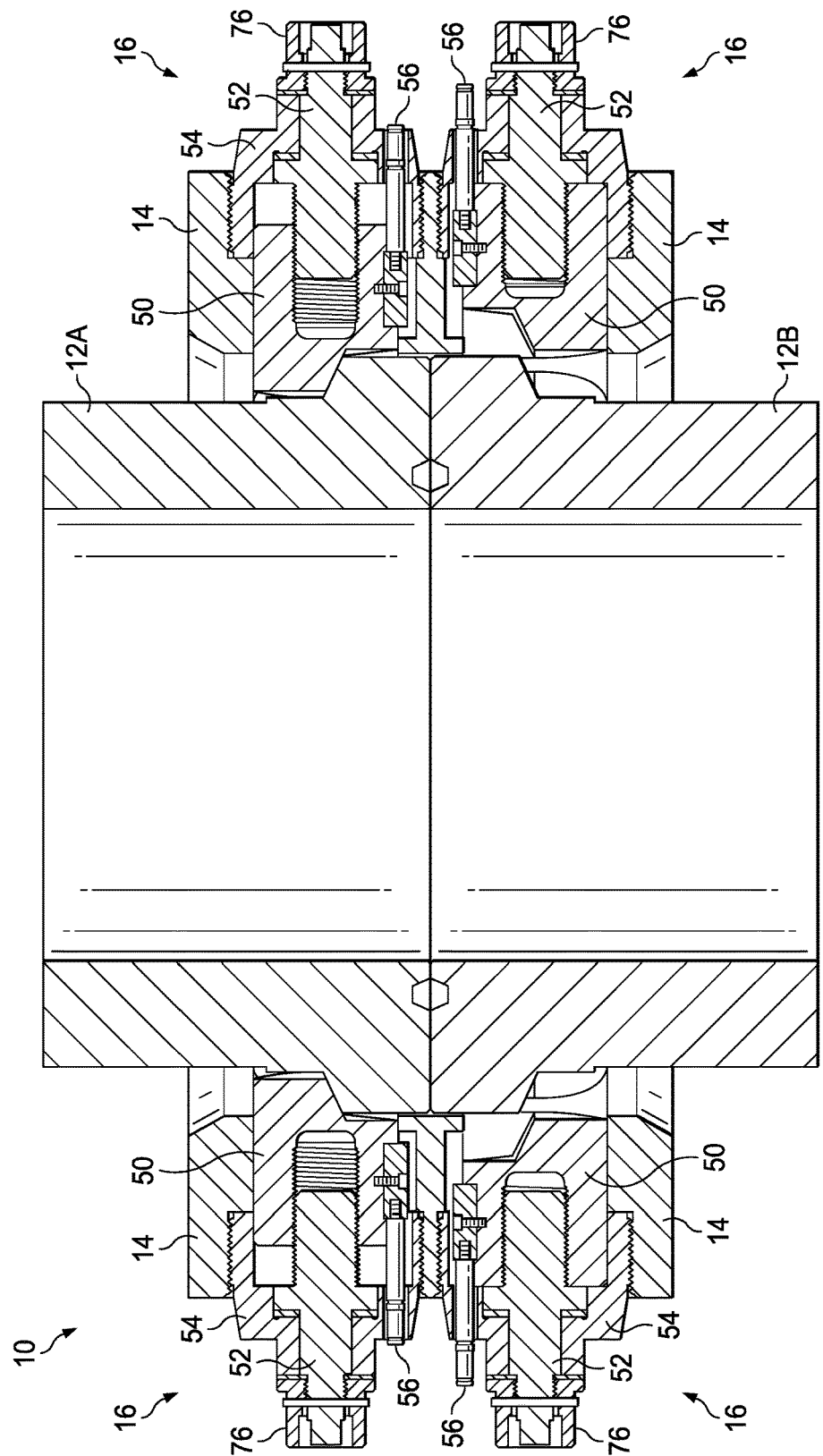
FIG. 2 is a cross sectional view of the hub clamp connecting the hubs of FIG. 1B taken along line A-A, in accordance with an embodiment of the present disclosure.

FIG. 2 is a cross sectional view of the hub clamping system 10 taken along line A-A of FIG. 1B. As shown, each clamp unit 16 disposed in the retaining ring 14 may include at least a collet mechanism 50, a screw device 52, a housing 54, and a visual indicator 56. The screw device 52 is engaged with the collet mechanism 50 via threads. That is, the screw device 52 includes a screw having external threads that are in a threaded engagement with internal threads formed in the collet mechanism 50.

The collet mechanisms 50 used in the hub clamping system 10 each individually contribute to the overall clamping force required to generate the seal on the API hubs 12. In the illustrated embodiment, the upper clamp units 16 are in a fully activated (engaged) position, such that a lower slanted surface of the collet mechanism 50 engages with an upper sloped surface of the upper hub 12A. When in the activated position, the clamp unit 16 provides a clamping force to the corresponding API hub 12. The lower clamp units 16 are illustrated in a non-activated (retracted) position, such that an upper slanted surface of the collet mechanism 50 is not in engagement with the lower sloped surface of the lower hub 12B. When all the clamp units 16 are brought into the non-activated position, the hub clamping system 10 may be removed from the API hubs 12.

Each of the individual clamp units 16 may be fully on-site serviceable and replaceable. That way, if a single collet mechanism 50 or other feature of a clamp unit 16 wears out or becomes damaged, the collet 50 and/or clamp unit 16 may be removed as a single unit and replaced without having to replace the entire hub clamping system 10. The removal and replacement may also be made without retracting, disengaging, or unclamping any of the other clamp units 16. For example, one of the collet mechanisms 50 may be removed by disconnecting the housing 54 from the retaining ring 14 (e.g., via threaded, bolted, or other type of connection) and then sliding the housing 54, screw device 52, and collet mechanism 50 (all together) out of the space in the retaining ring 14.

The screw devices 52 may be designed to selectively actuate the corresponding collet mechanisms 50 between the activated position and the non-activated position. As illustrated, each screw device 52 may be restrained linearly within the housing 54 attached to the outer retaining ring 14, providing an anchor for the compression forces (and reaction forces) on the collet mechanism 50 when moved to the activated position. The screw device 52 may be rotated within the housing 54, and this rotation may facilitate the linear actuation of the collet mechanism 50 between the non-activated and activated positions. The screw device 52 and corresponding housing 54 may be constructed to deliver the clamping forces required between the collet mechanism 50 and the corresponding hub 12. The screw device 52 may extend partially outside the housing 54 and the retaining ring 14, allowing access for an operator to rotate the screw device 52, either manually or using a torque mechanism.

The hub clamping system 10 may allow the upper set of collet mechanisms 50 or the lower set of collet mechanisms 50 to be fully retracted, thereby allowing the entire hub clamping system 10 to stay with a certain piece of equipment (e.g., one of the hubs 12). For example, the lower set of collet mechanisms 50 may be retracted away from the lower hub via rotation of their corresponding screw devices 52, and the lower hub 12B may then be removed from the hub clamping system 10. Retracting both the upper and lower sets of collet mechanisms 50 may allow the entire hub clamping system 10 to be removed as a single piece from the hubs 12 should it be required. For example, the entire hub clamping system 10 may be removed in this manner to allow the system 10 to be transferred to a secondary piece of equipment.

As mentioned above, each clamp unit 16 may include a visual indicator 56 designed to show an operator the position (activated, non-activated, or somewhere in between) of the collet mechanism 50 relative to the hub 12. In the illustrated embodiment, the upper clamp units 16 each feature the visual indicator 56 fully depressed into the housing 54 to indicate the activated state of the corresponding collet mechanism 50. The lower clamp units 16 feature the visual indicator 56 in an extended or protruding position relative to the housing 54, thereby indicating that the corresponding collet mechanism 50 is in the non-activated position.

The outer retaining ring 14 features an inner bore that is larger in diameter than an outer diameter of the protruding hub features on the hubs 12. That way, when the collet mechanisms 50 are pulled back into the non-activated positions, the collet mechanisms 50 are brought into alignment with the inner bore of the hub such that the corresponding hub feature can be removed from (e.g., slid out of) the hub clamping system 10. The outer retaining ring 14 (although bespoke to the size of hubs 12) may be significantly easier to manufacture than a conventional style clamp hub, since it has fewer features requiring complex machining. The style, type, and/or size of the clamp units 16 can be transferred across a range of hub sizes.

Figure 3:
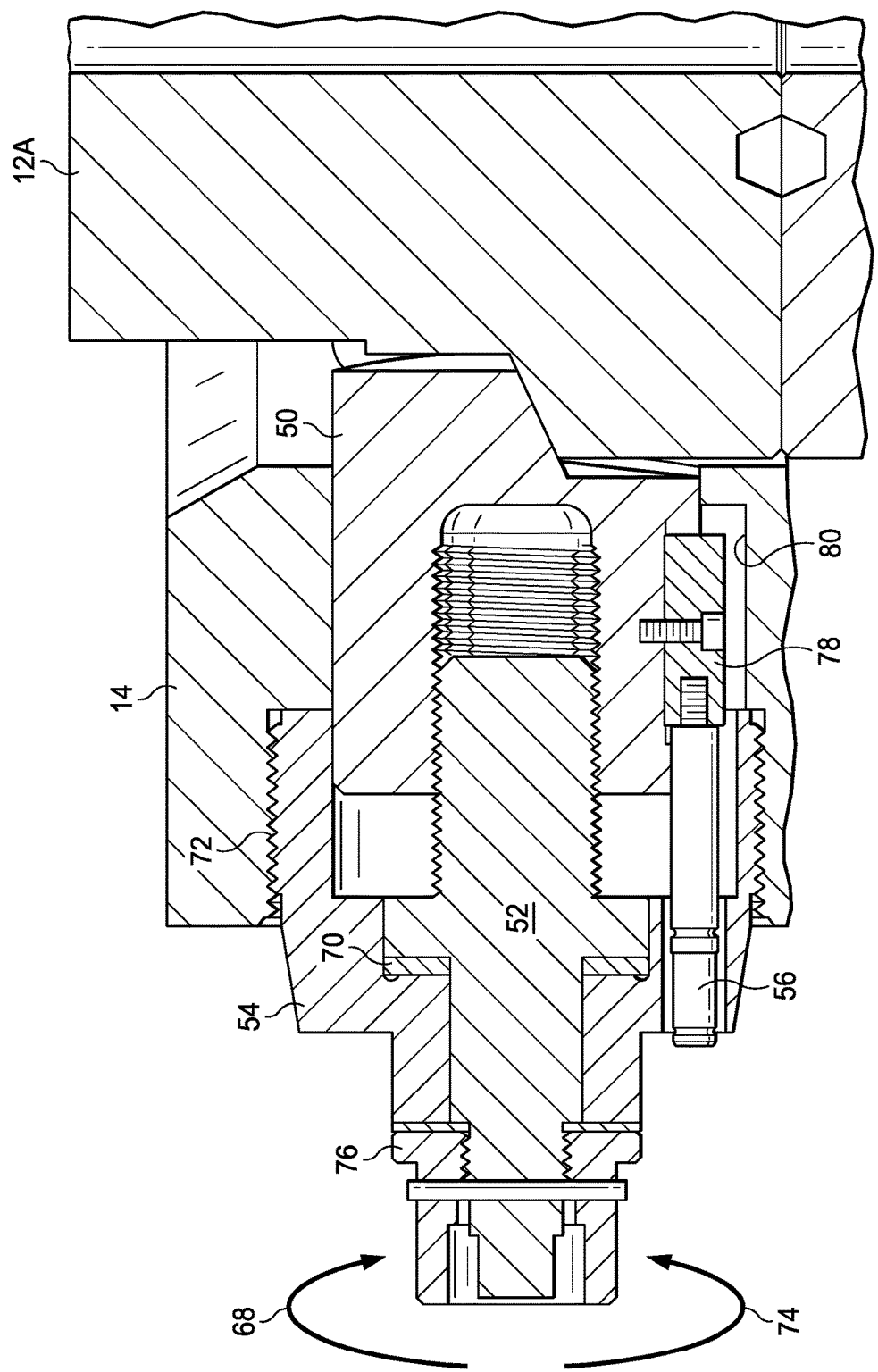
FIG. 3 is an expanded cross sectional view of a single clamp unit of the hub clamp of FIG. 2, in accordance with an embodiment of the present disclosure.

FIG. 3 a close-up view of one of the clamp units 16 (e.g., an upper clamp unit) of the hub clamping system 10 used to engage and retain a corresponding hub 12 (e.g., upper hub). As mentioned above, motion of the collet mechanism 50 is activated via the screw device 52. At one end, the screw device 52 is located in a space formed in the collet mechanism 50 via threaded features. At the opposite end, the screw device 52 may be retained in the retaining housing 54, such that the screw device 52 is able to rotate relative to the housing 54 but cannot move linearly (e.g., in a direction of screw axis) relative to the housing 54.

Rotating the screw device 52 in a first direction 68 via the engaged threads between the collet mechanism 50 and the screw device 52 extends the collet mechanism 50 toward the hub 12. Once the collet mechanism 50 starts to engage the hub 12, reaction forces may be fed back through the collet mechanism 50 into the screw device 52 (via the screw threads) and then through a thrust washer 70 located in the retaining housing 54. The housing 54 may include a grease port (not shown) formed therein to allow for periodic lubrication of the thrust washer 70. The housing 54 may be directly coupled to the outer retaining ring 14, providing a back stop (i.e., anchor) for the screw device 53 during this activating motion. As illustrated, the housing 54 may be coupled to the outer retaining ring 14 via a threaded feature 72. However, in other embodiments the housing 54 may be attached to the outer retaining ring 14 in other ways, such as via a plurality of bolts extending between the housing 54 and the outer retaining ring 14.

Rotating the screw device 52 in a second direction 74 opposite the first direction 68 via the engaged threads between the collet mechanism 50 and the screw device 52 may retract the collet mechanism 50 away from the hub 12. In this instance, the screw device 52 generally pulls on the collet mechanism 50, with the screw device 52 being restrained in position by an outer lock collar 76 coupled to the housing 54.

Since several clamp units 16 are positioned around the circumference of the clamping system 10 to provide clamping forces for holding the hubs 12 together, the torque requirement (for clamping) for any given clamp unit 16 is reduced compared to a conventional clamping system. This may allow for the use of smaller, less powerful torqueing devices to clamp the hubs 12 together, thereby resulting in easier operation and maintenance of the hub clamping system 10. In addition, the clamping forces provided to the hubs 12 are evenly distributed across all the collet mechanisms 50, thereby overcoming any preferential loading about the circumference of the hubs 12. For example, there is no maximum clamping force provided at a single circumferential position of the hubs (e.g., at the stud/nuts interface of a conventional clamping device) with less clamping at the mid-point of the clamp.

In the illustrated embodiment, a key 78 is attached to an outer surface of the collet mechanism 50. The key 78 is positioned and designed to run axially (e.g., parallel to rotational axis of the screw device 52) within a keyway 80 formed in the outer retaining ring 14. The key 78 that is coupled to the collet mechanism 50 and disposed within the keyway 80 may serve two purposes. First, the key 78 prevents the collet mechanism 50 from rotating about the axis of the screw device 52 as the screw device 52 rotates. That way, the key 78 forces the collet mechanism 50 to remain in the same rotational position as the screw device 52 rotates, and the rotation of the screw device 52 causes the collet mechanism 50 to translate linearly in the direction of the screw axis.

Second, the key 78 may provide a location feature for the visual indicator 56, as shown in FIG. 3. As the collet mechanism 50 is moved, the key 78 and the visual indicator 56 move as well, allowing an operator to visualize and determine the position of the collet mechanism 50 relative to the open (retracted) position and the engaged (activated) position. For example, in the illustrated embodiment, the end of the visual indicator 56 is disposed in a retracted position within the retaining housing 54 as the collet mechanism 50 is disposed in the engaged position against the hub 12. However, when the collet mechanism 50 is retracted away from the engaged position, the visual indicator 56 may move along with the collet mechanism 50 into a position where the end of the visual indicator 56 is extending outside of the housing 54.

The visual indicator 56 may allow for centralization of the hub clamping system 10 relative to the central hubs 12, for example, by simply setting the lower collet mechanisms 50 in the fully activated position such that the visual indicators 56 on the lower clamp units 16 are each disposed in approximately the same position. The upper collet mechanisms 50 may then be visually checked via the visual indicators 56 so that their setting position is equidistant around the periphery of the upper hub 12A, thereby providing a consistent clamping force for each clamp unit 16.

Figure 4:
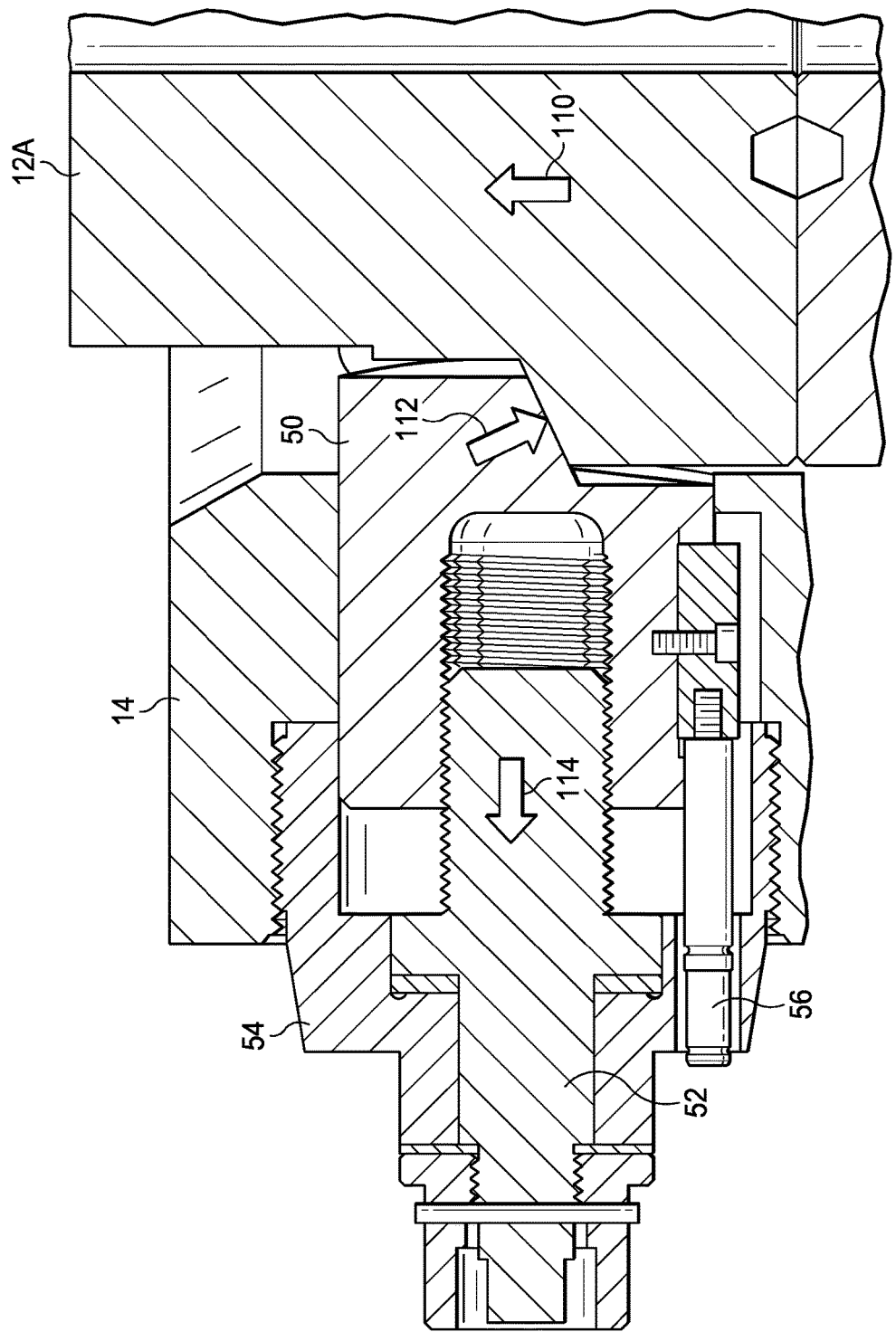
FIG. 4 is an expanded cross sectional view of the single clamp unit of the hub clamp of FIG. 2 showing the distribution of forces on the hub and the hub clamp, in accordance with an embodiment of the present disclosure.

FIG. 4 illustrates how the disclosed hub clamping system 10 distributes forces that act on the hubs 12 in response to high pressures within the hub connection. A first arrow 110 illustrates the force generated via the internal pressure on the hub connection, and this first force 110 may act on the hub 12 in a vertical direction as shown. The first force 110 is equal to the internal pressure multiplied by the cross sectional area of the bore through the hub 12. A second arrow 112 illustrates the clamping force exerted from the pressurized hub 12 to the clamp unit 16 via the engagement of the slanted face of the hub 12 with the corresponding collet mechanism 50. The vertical pressure force 110 acting on the hub 12 is transferred from the hub 12 to the collet mechanism 50 as the clamping force 112. A third force 114 in a direction of the screw axis ultimately resolves the internal pressure force on the hub connection. That is, a horizontal component of the clamping force 112 is transferred from the collet mechanism 50 through the screw device 52 and is resolved via a reaction force between the screw device 52 and the retaining housing 54, thrust washer 70, and/or outer retaining ring 14. Thus, the disclosed hub clamping system 10 is able to retain the hubs 12 together and dissipate forces resulting from the internal pressures on the hub connection.

Figure 5A:
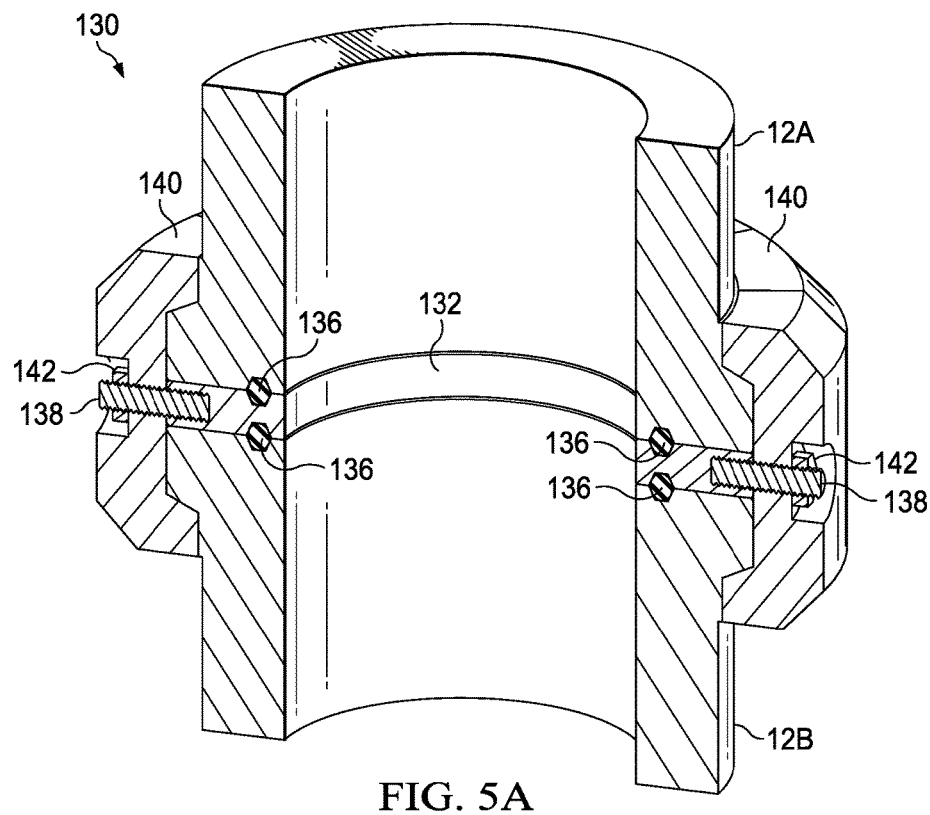
FIG. 5A is a perspective cutaway view of another hub clamp used to connect two API hubs, in accordance with an embodiment of the present disclosure.
Figure 5B:
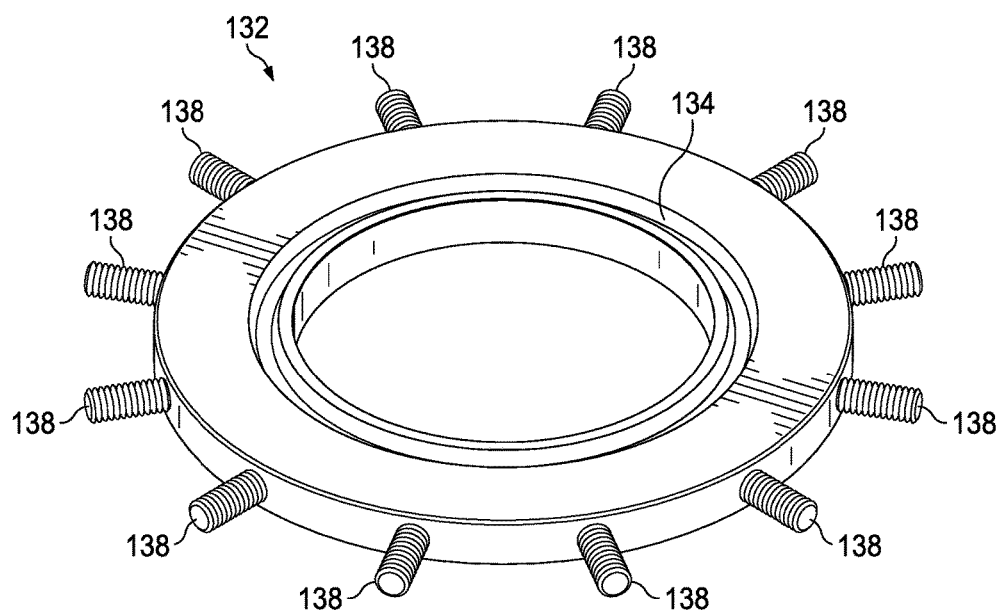
FIG. 5B is a perspective view of an integral seal ring used in the hub clamp of FIG. 5A, in accordance with an embodiment of the present disclosure.

FIGS. 5A and 5B illustrate another embodiment of a hub clamping system 130 that may be utilized to hold two opposing hubs 12 in connection with each other and seal the hubs 12 under high pressure conditions. The illustrated hub clamping system 130 may include an integral seal ring 132, as shown in the larger clamping assembly in FIG. 5A and alone in FIG. 5B. As shown, the seal ring 132 may be mounted between opposing faces of the two hubs 12 to provide a sealing arrangement. The seal ring 132 may include grooves 134 formed on opposite sides to receive rubber or metal seals 136 used to seal against the opposing hubs 12.

The seal ring 132 may also include a plurality of circumferentially arranged studs 138 extending in a radial direction therefrom. These studs 138 may each include threads formed at least around the ends extending farthest from the seal ring 132. The hub clamping system 130 may further include a plurality of shaped collet mechanisms 140 disposed around the seal ring 132. Each collet mechanism 140 may include two sloped faces designed to selectively engage both a sloped face of the upper hub 12A and a sloped face of the lower hub 12B.

As shown, the studs 138 on the seal ring 132 may extend at least partially through openings formed in the corresponding collet mechanisms 140. The studs 138 may allow for the corresponding collet mechanisms 140 to be attached to the studs 138 via rotating nuts 142. Each rotating nut 142 may be disposed on the threads of the corresponding stud 138 and rotated on the stud 138 to reposition the collet mechanism 140 linearly along the stud axis. For example, the nut 142 may be rotated in a first direction to draw the collet mechanism 140 into engagement with the hubs 12 to hold the hubs 12 together against the seal ring 132. The nut 142 may be rotated in the opposite direction to pull the collet mechanism 140 away from the hubs 12.

Figure 6:
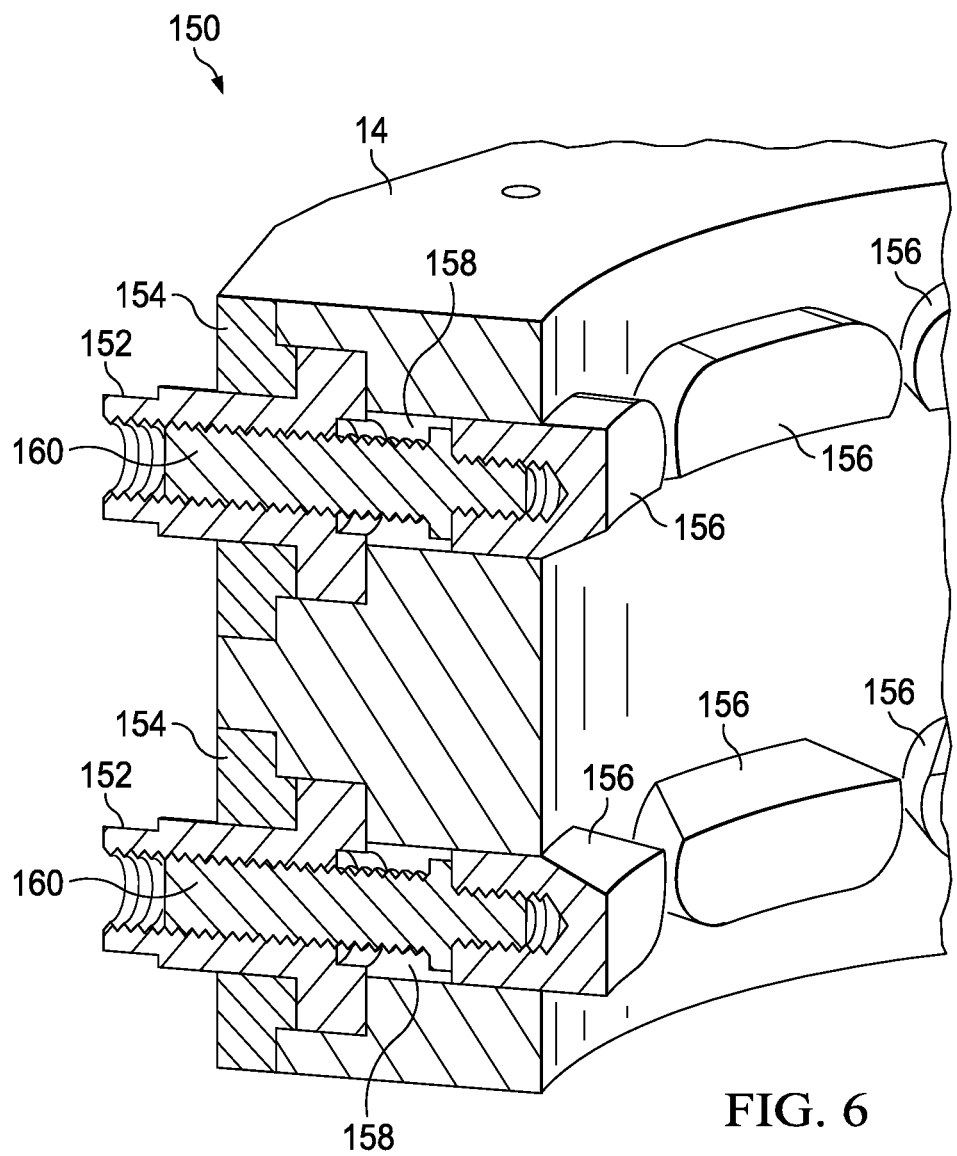
FIG. 6 is a perspective cutaway view of another hub clamp that can be used to connect two API hubs, in accordance with an embodiment of the present disclosure.

Another embodiment of a hub clamping system 150 is illustrated in FIG. 6. This hub clamping system 150 utilizes a plurality of rotating nuts 152 (instead of a screw device) held within housings 154 attached to the retaining ring 14. The hub clamping system 150 also includes a plurality of shaped collet mechanisms 156 positioned within pockets 158 formed in the retaining ring 14. The pockets 158 help to align the collet mechanisms 156 and to limit rotation of the collet mechanisms 156 as the clamping system 150 is activated.

An arrangement of radially positioned studs 160 may be disposed through the rotating nuts 152 and coupled at one end to the collet mechanisms 156. Each stud 160 may include a threaded portion that is rotatably coupled to an internal threaded portion of the rotating nut 152. As the nut 152 is selectively rotated, the stud 160 may move linearly relative to the nut 152 in a direction of the stud axis to draw the collet mechanism 156 into or out of engagement with the slanted surfaces of the hubs (not shown).

Figure 7A:
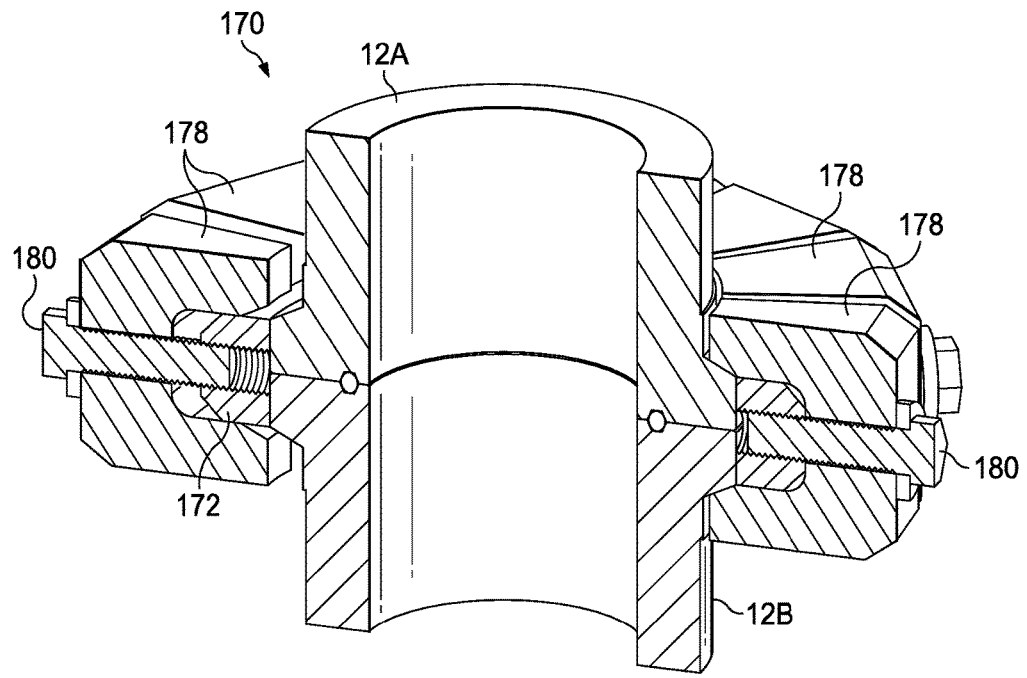
FIG. 7A is a perspective cutaway view of another hub clamp used to connect two API hubs, in accordance with an embodiment of the present disclosure.
Figure 7B:
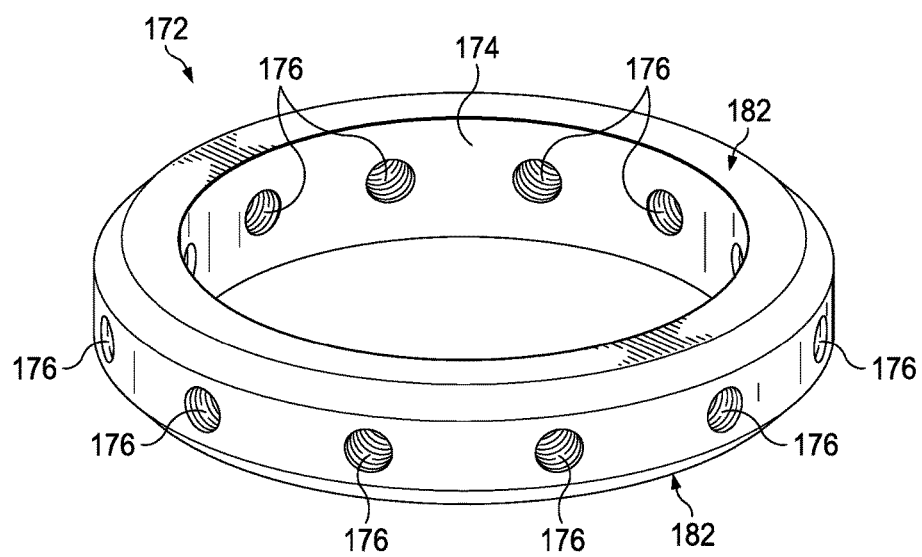
FIG. 7B is a perspective view of an inner retaining ring of the hub clamp of FIG. 7A, in accordance with an embodiment of the present disclosure.

A further embodiment of a hub clamping system 170 is illustrated in FIGS. 7A and 7B. This hub clamping system 170 utilizes an inner retaining ring 172 (as opposed to an outer retaining ring), and the inner retaining ring 172 is illustrated in depth in FIG. 7B. The inner retaining ring 172 may include an inner circumferential surface 174 designed to interface with the upper and lower hubs 12 as shown in FIG. 7A. In addition, the inner retaining ring 172 may include several apertures 176 formed therethrough. The hub clamping system 170 may also include a plurality of collet mechanisms 178, each collet mechanism 178 bolted to the inner retaining ring 172 via a threaded bolt or stud 180. Rotating the stud 180 relative to the collet mechanism 178 and the inner retaining ring 172 may bring the collet mechanism 178 into engagement with an external surface of the retaining ring 172 and into connection with the opposing hubs 12 forming the hub connection. Rotating the stud 180 in an opposite direction may loosen the collet mechanism 178 from the hubs 12.

As illustrated, the inner retaining ring 172 may include flat parallel sides 182 defining the top and bottom of the inner retaining ring 172. These parallel sides 182 may help to guide the collet mechanisms 178 as they are moved toward or away from the hubs 12 via rotation of the studs 180. For example, the parallel sides 182 may interface with parallel internal surfaces of the collet mechanism 178 to prevent the collet mechanism 178 from rotating along with the corresponding stud 180. This aids the alignment and engagement of the collet mechanism 178 relative to the hubs 12, so that the collet mechanism 178 does not spin on its axis and engage the hub 12 in an undesired manner.

Other arrangements of collet mechanisms, retaining rings, and rotatable screws, bolts, studs, washers, etc. may be utilized in other embodiments to provide a hub clamping mechanism with a plurality of clamp units as disclosed herein.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

What is claimed is:

1. A hub clamping system for use to clamp a pair of hubs together, comprising:
   an outer retaining ring comprising an inner bore having a diameter larger than an outer diameter of the pair of hubs; and
   a plurality of clamp units disposed in the outer retaining ring, wherein each of the plurality of clamp units comprises:
      a collet mechanism comprising a slanted surface shaped to engage a slanted surface of one of the pair of hubs;
      a housing mounted to the outer retaining ring; and
      a screw device coupled to the collet mechanism via threads and disposed within the housing, wherein the screw device is rotatable relative to the housing to selectively move the collet mechanism between an activated position and a retracted position relative to the slanted surface of the one of the pair of hubs;
   wherein the plurality of clamp units comprises a first set of clamp units disposed in an upper portion of the outer retaining ring and configured to engage an upper one of the pair of hubs, and a second set of clamp units disposed in a lower portion of the outer retaining ring and configured to engage a lower one of the pair of hubs.

2. The hub clamping system of claim 1, wherein each of the plurality of clamp units further comprises a visual indicator that is visible from outside the housing and configured to change positions based on a position of the collet mechanism.

3. The hub clamping system of claim 2, wherein each of the plurality of clamp units further comprises a key coupled to the collet mechanism, wherein the key prevents rotation of the collet mechanism relative to the outer retaining ring, and wherein the visual indicator is mounted within the key.

4. The hub clamping system of claim 1, wherein the collet mechanism in the activated position is engaged with the slanted surface of one of the pair of hubs, and wherein the collet mechanism in the retracted position is retracted toward the inner bore of the outer retaining ring.

5. The hub clamping system of claim 1, wherein the plurality of clamp units are arranged circumferentially around the retaining ring.

6. The hub clamping system of claim 1, wherein each of the plurality of clamp units further comprises a thrust washer disposed in the housing adjacent the screw device.

7. The hub clamping system of claim 1, wherein the housing is mounted to the outer retaining ring via a threaded connection.

8. A method, comprising:
   disposing a hub clamping system over a pair of hubs, wherein the hub clamping system comprises a plurality of clamp units disposed within an outer retaining ring, wherein each of the plurality of clamp units comprises:
      a collet mechanism comprising a slanted surface;
      a housing mounted to the outer retaining ring; and
      a screw device coupled to the collet mechanism via threads and rotatably disposed within the housing;
   rotating the screw device in a first direction relative to the housing to move the collet mechanism into an activated position such that the slanted surface of the collet mechanism engages a slanted surface of one of the pair of hubs;

retaining the pair of hubs together via the hub clamping system when all of the plurality of clamp units are activated;

rotating the screw devices of a lower set of the plurality of the clamp units in a second direction to retract the collet mechanisms of the lower set away from a lower one of the pair of hubs; and removing the lower one of the pair of hubs from the hub clamping system.

9. The method of claim 8, further comprising:

rotating the screw devices of the plurality of clamp units in the second direction to retract the collet mechanisms of the plurality of clamp units away from the pair of hubs; and removing the hub clamping system from the pair of hubs.

10. The method of claim 8, further comprising automatically moving a visual indicator extending outside of the outer retaining ring in response to movement of the collet mechanism.

11. The method of claim 10, further comprising preventing rotation of the collet mechanism relative to the outer retaining ring via a key coupled to the collet mechanism, wherein the visual indicator is mounted to the key.

12. The method of claim 10, further comprising centralizing the hub clamping system around the pair of hubs by ensuring that the visual indicators on all of the clamp units are in approximately the same radial location relative to the outer retaining ring.

13. The method of claim 8, further comprising evenly distributing clamping forces from the hub clamping system to the pair of hubs about a circumference of the pair of hubs.

14. The method of claim 8, further comprising removing and replacing one of the plurality of clamp units from the outer retaining ring without disengaging any other clamp units.

15. The method of claim 14, wherein removing one of the plurality of clamp units comprises disconnecting the housing from the outer retaining ring and sliding the housing, the screw device, and the collet mechanism out of a space in the outer retaining ring.

16. The method of claim 8, further comprising distributing a vertical internal pressure force acting on the pair of hubs that are retained together through the collet mechanism and into a reaction force dissipated through the screw device, the housing, and the outer retaining ring.

17. The method of claim 8, further comprising rotating the screw in the first direction relative to the housing via a torque transmitting tool.

* * * * *